April 22, 1952  E. HAGENLOCHER  2,593,877
FLEXIBLE COUPLING
Filed Sept. 18, 1945
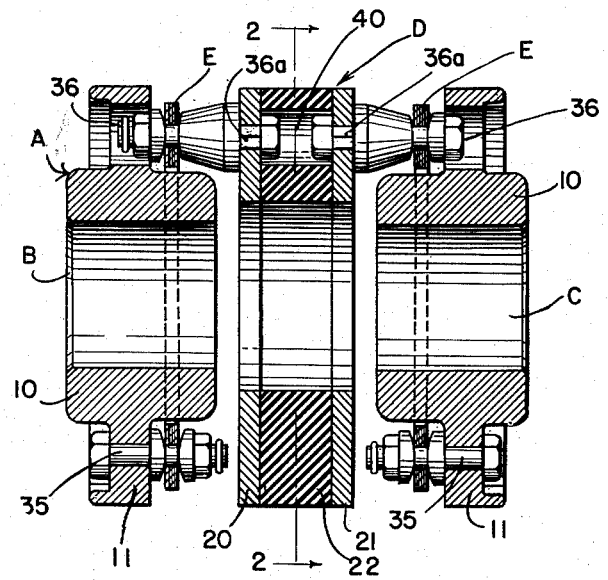
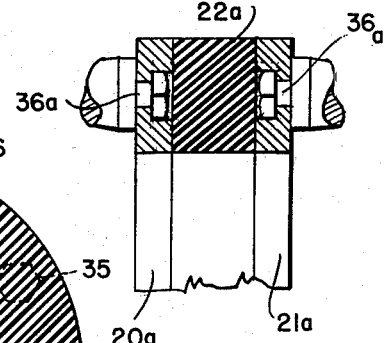
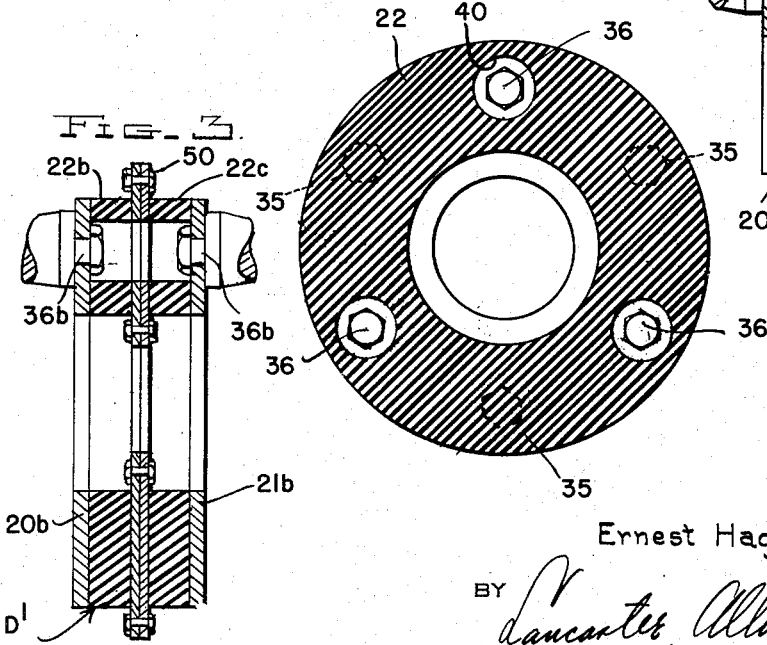
INVENTOR.
Ernest Hagenlocher
BY Lancaster, Allwine & Rommel
ATTORNEYS Patented Apr. 22, 1952

2,593,877

UNITED STATES PATENT OFFICE 2,593,877

FLEXIBLE COUPLING

Ernest Hagenlocher, Warren, Pa.

Application September 18, 1945, Serial No. 617,028

7 Claims. (Cl. 64—13)

This invention relates to improvements in flexible coupling.

The primary object of this invention is the provision of an improved flexible coupling possessing compensating characteristics to take care of angular misalignment and parallel misalignment such as generally set forth in United States Patent 2,182,711 and co-pending applications filed November 20, 1944, Serial Numbers 564,254 and 564,255, now abandoned, but embodying improvements thereover in the provisions of a torsionally resilient structure which will provide for shock absorption as well as a predetermined amount of torsional deflection for the purpose of changing the torsional frequency in a shaft system so that critical speeds in the shaft system will fall outside the operating range, as well as to take care of parallel misalignment, angular misalignment and free end float.

A further object of this invention is the provision of an improved coupling which will find general application in certain industrial fields utilizing power units which have short shaft lengths. The improved coupling is of such nature as to compensate for parallel misalignment, angular misalignment and at the same time will yield torsionally under the imposition of angular shearing forces in such manner as to insure long life for the coupling and the connected machines by placing the major critical speeds outside the operating range.

A further object of this invention is the provision of an improved coupling such as above mentioned which is constructed so that there are no frictionally engageable movable wearing parts and thereby eliminating the need for lubrication.

It is a further object of this invention, to absorb and damp during the operation of two shafts connected by the improved coupling, such irregularities of rotary motion as disturbing oscillations, vibrations and shock.

A further object of this invention is the provision of an improved coupling embodying a resilient shock absorbing insert, usually of ring-shaped formation and adapted to absorb only torsional stresses. With this is associated in a novel relation a double type of metal disc coupling structure which takes care of radial and axial forces. This combination is a distinct improvement over present day types of couplings using rubber as a cushioning medium. In the conventional present day rubber coupling, the rubber insert must transmit power in shear, compression and tension or some combination of the three, as well as take the complicated stresses introduced by the misalignment encountered. This compound imposition of stresses on the rubber is damaging and destructive to the rubber.

Other objects and advantages of the invention will appear in the following detailed description.

In the accompanying drawings, forming a part of this specification, and wherein similar reference characters designate corresponding parts throughout the several views, Figure 1 is a longitudinal cross sectional view taken through the improved coupling in rest position.

Figure 2 is a vertical cross sectional view taken through the coupling.

Figure 3 is a fragmentary cross sectional view showing a modified form of coupling structure to take care of torsional shear.

Figure 4 is a fragmentary cross sectional view showing a further modified form of torsionally resilient coupling structure.

In the drawings, wherein for the purpose of illustration are shown various forms of the invention, the letter A may generally designate the coupling. It consists of so-called end coupling flanges or members B and C adapted to be placed upon drive and driven shafts (not shown). The center coupling structure D is provided, of an inherent resilient torsional nature, under the imposition of angular shearing forces; the same being connected to the coupling flanges B and C by sets E of metal discs of the nature described in the above identified patent and co-pending applications.

The coupling flanges or members B and C may each consist of a hub portion 10 and an attaching flange 11 to which the sets of flexible disc rings are connected.

The structure D consists of metal rings or members 20 and 21, having bonded to the facing surfaces thereof an inherently resilient rubber or composition ring 22. This ring or member 22 has an inherent resiliency sufficient to take care of the torsional shear desired in the desired type coupling. In this connection the shearing stress of ring 22 has a very definite relation to the shearing stress of the metal disc sets E, in order to take care of shearing forces imposed upon the shafting with which the coupling is to be used; the sets of discs E in themselves being of such nature as to take care of parallel misalignment and angular misalignment substantially to the exclusion of distortion of the ring 22 under such conditions of misalignment. The term "rubber" as used in this specification and the claims is to be construed as any resilient material capable of satisfying under normal operating conditions, the strains, stresses and conditions imposed upon conventional rubber cores or sandwiches as understood in the art relating to flexible couplings.

The vulcanization or bonding rubber to metal is well understood in the art. Merely by way of example the faces of the metal rings or members 20 and 21 may be thoroughly cleaned and electroplated with a suitable brass alloy. Cement may then be applied and the rubber member 22 assembled against the cemented surfaces. Preferably I use uncured structural rubber having the desired physical characteristics for the particular type of coupling to be used, but of course I may use other materials of composition nature, if so desired, since the main consideration is that the rubber shall have inherent torsional resiliency. The assembly is then put into a mold and subjected to high pressure under high temperature conditions, preferably substantially about 300° F. in order that the material will properly vulcanize with the metal prepared surfaces.

The individual discs of the sets E are preferably of stainless steel, or other fatigue resisting metal. Individually and in sets they will readily flex to take care of conditions of angular misalignment and parallel misalignment of the coupling parts. These discs are preferably dialed as to graining in the manner set forth in Patent 2,182,711, or they may be of the nature set forth in either of the above identified Nelson applications. These discs may be provided with suitable openings, of any approved nature. In the present instance they are shown as provided with six openings, altho they may be provided with any desired arrangement of openings desired. Bolts 35 connect the individual sets E to their respective flanges 11 of the coupling members B and C, and other bolts 36 may connect sets E to the torsionally resilient coupling structure D in any of a variety of ways.

In the couplings shown, each coupling flange B or C is provided with a pair of diametrically opposed bolt structures 35 connecting the discs thereto, with the other bolt structure 36 connecting the disc E to the torsionally resilient coupling structure D at positions of 90° with respect to the bolts 35.

The rubber or torsionally resilient member 22 may be provided with suitable openings or sockets 40 to receive the heads of the bolt structure 36; the latter being bolted to the metal plates 20 and 21, as shown and having square shank portions 36$^a$ filling in square openings in the plates 20 and 21 to prevent turning of the bolts.

It may be desirable, under some circumstances, so as not to weaken the rubber insert 22 at any point, to countersink the bolt heads in the openings in the metal plates 20$^a$ and 21$^a$, as indicated for the bolt structures 36$^a$ shown in Figure 4. Thus, there need be no coring or molding of bolt head receiving openings in the rubber ring.

Under some circumstances, for the purpose of damping out rotational torque, I may use the type of torsionally resilient structure D' shown in Figure 3, which consists of metal plates or members 20$^b$ and 21$^b$ corresponding to the plates 20 and 21 of the form of invention shown in Figure 1, and to which B and C may be connected by bolt structure 36$^b$. The rubber inserts or rings 22$^b$ and 22$^c$ are provided in parallel pairs respectively vulcanized or bonded to the metal plates 20$^b$ and 21$^b$ and having a joining metal plate structure 50 therebetween to which the rings 22$^b$ and 22$^c$ are bonded or vulcanized in the manner above described. This plate structure 50 is formed of two detachable plates bolted together for access to the heads of bolts 36$^b$.

In the coupling structure it is not necessary to use two sets of flexible metal rings, such as shown, since it is entirely possible to use only one set of these rings, but in that case all conditions of angular misalignment will be taken care of by the single set of rings E. It is of course necessary, in order to carry out the objects of this invention, that the torsionally resilient structure D be used with the coupling, and in which case one of the plates of this coupling may have a coupling flange directly bolted thereto.

The discs E will take care of conditions of parallel and angular misalignment to the exclusion of the torsionally resilient structure D, which merely takes care of angular shear. In the case of parallel misalignment the shearing stresses of the rubber or composition material of the ring 22 will be less than corresponding shearing force in the plane of the ring E under normal conditions. Thus, torsional stresses will be taken care of by the ring 22. The sets E will, of course, flex much more readily under conditions of angular misalignment or parallel misalignment than the material of the ring 22, so that no appreciable amount of distortion for such conditions is taken care of by the material of the ring 22.

It is within the contemplation of my invention to have the torsionally resilient structure D, as well as the disc sets E, take care of the desired proportionate distortion due to all conditions of torsional shear as well as distortion incident to parallel misalignment or angular misalignment of shaft; it being an important feature of this invention that the coupling be such that it can be used in connection with power units where the shafting is so short as not to have the desired amount of angular flexibility.

It is readily understandable from the foregoing that the improved coupling will eliminate the hazard of wear. The coupling parts are connected together in such manner as to obviate friction of moving parts, so that the coupling will be long lived.

It should be noted from the foregoing that the improved coupling will also take care of end float of shaft, and in this connection the end float will, of course, cause distortion of the discs E and not any appreciable transverse distortion of the rubber insert of the structure D.

Under conditions of use it is obvious that the drive and driven shafts will not buck each other and set up torsional vibrations. Such torsional vibrations will be damped out by the structure D as above enumerated. While I do not want to be limited to any desired degree of angular distortion of the rubber under torsional shear, I prefer a range of from .04° to 16° angular distortion for various types of couplings.

It will be apparent from the foregoing that an improved coupling structure has been provided in which the torsionally resilient part of the coupling is of a nature to take only torsional stresses as an incident of relative turning movement between the shafts or coupling parts whereby to absorb and damp disturbing oscillations, vibrations and shocks incident to rotary motion. In couplings heretofore utilizing rubber, in addition to torsional stresses such rubber must also take care of parallel and angular misalignment of shafts and also free end float therebetween. In the present coupling the arrangement of discs provides for angular or parallel misalignment of the shafts or coupling parts and the metal discs also take care of free end float.

Various changes in the shape, size and arrangement of parts may be made to the form of invention herein shown and described, without departing from the spirit of the invention or the scope of the following claims.

I claim:

1. In a flexible coupling the combination of a pair of coupling attaching parts, sets of transversely flexible laminated discs respectively connected with said attaching parts, a coupling structure between said attaching parts including metal side plates, means connecting said metal side plates with said sets of discs at locations other than the locations which attach said discs to said attaching parts, and a resilient material attached with and located between said metal plates which will flex under the imposition of angular shearing forces in a plane normal to the axis of said coupling.

2. In a flexible coupling the combination of a pair of shaft attaching coupling parts, a pair of individual sets of laminated metal discs having only transverse flexibility, means connecting one set to the inner side of one of the coupling parts and the other set similarly to the inner side of the other coupling part, an inherently flexible coupling member of resilient rubber, and means connecting said member to said sets of laminations and located therebetween, said inherently flexible member being of such nature as to produce a positive drive connection between the coupling parts and to flex within a plane normal to the axis of rotation of the coupling to take care of torsional stresses as an incident of relative turning movement between the coupling parts whereby to absorb and damp disturbing oscillations, vibrations and shock incident to rotary motion.

3. In a flexible coupling the combination of a pair of shaft coupling connecting parts, a set of laminated steel discs for each of said coupling parts, means connecting said sets of laminated steel discs to said coupling parts, one to each, and in relatively spaced relation whereby the coupling parts may move relative to each other endwise and angularly, a pair of inherently resilient rubber-like discs, means detachably connecting them together for cooperative movement, and means connecting the rubber-like discs in spaced relation to and with said sets of steel discs.

4. In a flexible coupling the combination of a pair of shaft attaching coupling parts, and means connecting said coupling parts together including a plurality of transversely flexible disc laminations of steel which are transversely flexible and a resilient rubber load supporting inherently flexible member connected to the steel laminations and having transverse flexibility in a plane normal to the axis of the coupling, said steel laminations being arranged in planes normal to the axes of the coupling parts and taking care of parallel and angular misalignment and end float, and the resilient rubber member taking care of torsional stresses on a torsion axis substantially parallel with the axis of the rotation of the shaft as an incident of relative turning movement between the coupling parts whereby to absorb and damp disturbing oscillations, vibrations and shock incident to rotary motion.

5. In a flexible coupling the combination of a pair of metal plates, means detachably connecting said metal plates together in relative abutment, inherently resilient members bonded with said metal plates on the outer sides thereof and in non-obstructing relation with respect to the means which connects said plates together, shaft attaching coupling parts, metal plates bonded at the outer sides of said inherently resilient members, and means connecting said last mentioned metal plates with said shaft attaching coupling parts including laminated laterally flexible metal disc sets adapted to laterally flex between the metal plates to which attached and the coupling parts for the purpose of taking care of parallel and angular misalignment and end float while providing a positive elastic drive connection without backlash.

6. A flexible coupling adapted to connect drive and driven shafts comprising a pair of coupling parts for connection, one to each of the shafts, a central coupling structure including a resilient rubber sandwich possessing the inherent ability to flex torsionally on a torsion axis substantially parallel to the axis of the coupling and of a nature to provide a positive drive connection between the coupling parts, a plurality of sets of laminated flexible metal discs, means connecting said sets to said sandwich with one set of the laminated discs at one side of the sandwich and the other set of laminated discs at the opposite side of the sandwich, and means connecting said laminated disc sets with said coupling parts in such relation as to take care of parallel and angular misalignment and end float of the coupling and establish a positive elastic drive connection between the coupling parts without appreciable backlash.

7. In a flexible coupling the combination of a pair of coupling parts adapted to be connected to drive and driven members, sets of transversely flexible disc laminations of a nature to flex radially and axially but having sufficient annular stiffness within the planes thereof to effect a positive elastic drive connection without backlash, means connecting the sets of such laminations to the inner sides of the coupling parts at spaced locations around the sets, a central connecting structure including a resilient rubber sandwich which possesses the ability to effect a positive drive connection between the coupling parts and to flex torsionally in a plane normal to the axis of the coupling, and means connecting said central connecting structure with the sets of discs at spaced locations around the disc sets other than the locations of the connections which said disc sets have with their respective coupling parts.

ERNEST HAGENLOCHER.

REFERENCES CITED

The following references are of record in the file of this patent:

UNITED STATES PATENTS

| Number | Name | Date |
|---|---|---|
| 1,795,765 | Dickerson | Mar. 10, 1931 |
| 1,842,582 | Bulley | Jan. 26, 1932 |
| 2,182,711 | Thomas | Dec. 5, 1939 |

FOREIGN PATENTS

| Number | Country | Date |
|---|---|---|
| 521,912 | Great Britain | 1940 |
| 554,761 | Great Britain | 1943 |
| 864,579 | France | 1941 |